US007162219B2

(12) United States Patent
Wolf

(10) Patent No.: US 7,162,219 B2
(45) Date of Patent: Jan. 9, 2007

(54) MAKING AN EMERGENCY CALL FROM A PRE-ESTABLISHED CONNECTION

(75) Inventor: Stefan Wolf, Schwieberdingen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 193 days.

(21) Appl. No.: 10/912,626

(22) Filed: Aug. 5, 2004

(65) Prior Publication Data
US 2005/0090226 A1    Apr. 28, 2005

Related U.S. Application Data

(63) Continuation of application No. PCT/EP03/01133, filed on Feb. 5, 2003.

(30) Foreign Application Priority Data
Feb. 5, 2002    (DE) ............... 102 04 480

(51) Int. Cl.
*H04M 11/04*    (2006.01)
(52) U.S. Cl. ............... 455/404.1; 455/414.1
(58) Field of Classification Search ............ 455/404.1, 455/404.2, 456.1, 456.5, 456.6, 550.1, 575.9, 455/414.1
See application file for complete search history.

(56) References Cited

U.S. PATENT DOCUMENTS

| 5,428,666 | A | * | 6/1995 | Fyfe et al. ............... 455/551 |
| 5,630,209 | A | * | 5/1997 | Wizgall et al. ............ 455/521 |
| 5,918,172 | A | * | 6/1999 | Saunders et al. ........ 455/404.1 |
| 6,073,004 | A | | 6/2000 | Balachandran ............ 455/404 |
| 6,115,598 | A | * | 9/2000 | Yu ....................... 455/404.1 |
| 6,151,298 | A | * | 11/2000 | Bernhardsson et al. ..... 370/225 |
| 6,282,491 | B1 | * | 8/2001 | Bochmann et al. ......... 701/209 |
| 6,360,103 | B1 | * | 3/2002 | Veerasamy ............... 455/512 |
| 6,574,484 | B1 | * | 6/2003 | Carley .................... 455/521 |
| 6,600,914 | B1 | * | 7/2003 | Uhlik et al. ............ 455/404.1 |
| 6,636,732 | B1 | * | 10/2003 | Boling et al. .......... 455/404.1 |
| 6,647,267 | B1 | * | 11/2003 | Britt et al. ............. 455/404.2 |

(Continued)

FOREIGN PATENT DOCUMENTS

DE    198 31 929 C 1    11/1999

(Continued)

OTHER PUBLICATIONS

European Patent Office Search Report regarding Application No. PCT/EP 03/01133, dated May 14, 2003, 7 pages.

*Primary Examiner*—William Trost
*Assistant Examiner*—James D. Ewart
(74) *Attorney, Agent, or Firm*—Brinks Hofer Gilson & Lione

(57) ABSTRACT

An emergency call system is presented, which when an emergency call is initiated, instantaneously retrieves and transmits an identification key using an established communication link with a communication network. Therefore, the emergency call system does not need to unregister from the established communication link and establish a new communication link in order to transmit the identification key. The system includes an emergency call device, which includes a mobile communication device for communicating with the communication network, a regular-use data module storing non-emergency use information, an emergency data module storing emergency use information, such as an identification key, a data retrieving module for retrieving information from the emergency and/or regular-use data modules. When the emergency call device is implemented in a vehicle, the data retrieving module for the regular-use and/or emergency data modules may be in communication with a multimedia device via a local communication network.

24 Claims, 3 Drawing Sheets

U.S. PATENT DOCUMENTS

| | | | |
|---|---|---|---|
| 6,778,828 B1 * | 8/2004 | Chander et al. | 455/435.1 |
| 6,799,155 B1 * | 9/2004 | Lindemann et al. | 703/24 |
| 6,819,929 B1 * | 11/2004 | Antonucci et al. | 455/445 |
| 6,859,650 B1 * | 2/2005 | Ritter | 455/406 |
| 6,937,150 B1 * | 8/2005 | Medema et al. | 340/539.12 |
| 7,003,303 B1 * | 2/2006 | Khawand et al. | 370/431 |

FOREIGN PATENT DOCUMENTS

| | | |
|---|---|---|
| DE | 199 25 254 A 1 | 12/2000 |
| WO | WO 97/23104 | 6/1997 |
| WO | WO 01/41458 A2 | 6/2001 |

* cited by examiner

MAKING AN EMERGENCY CALL FROM A PRE-ESTABLISHED CONNECTION

PRIORITY CLAIM

This application is a continuation of PCT Application No. PCT/EP03/01133, filed Feb. 5, 2003, which claims priority based on German Patent Application No. 102 04 480.5, filed Feb. 5, 2002. The disclosures of the above applications are incorporated herein by reference.

BACKGROUND OF THE INVENTION

1. Technical Field

The invention relates to an emergency call system including an emergency call device and a method for initiating an emergency call.

2. Related Art

Two data modules, such as subscriber identity module cards ("SIM cards"), are generally employed to use a mobile phone, such as a cellular phone, for initiating conventional as well as emergency calls. When used in a vehicle, the two SIM cards may be employed in the vehicle itself. A regular-use SIM card is used for the conventional calls and an emergency SIM card is used for initiating the emergency calls. When an emergency call is placed, such as when a user presses an emergency button on a mobile phone after an accident, the emergency SIM card transmits an identification key to a network operator. The SIM card provides the network operator with a corresponding identification key that identifies the user. The network operator then verifies that the received identification key corresponds to one of the identification keys recognized by the network operator, and initiates whatever measures are standard for emergency call reception.

When an emergency call is initiated over a network, for example, a cellular network, the cellular phone switches from the regular-use SIM card to the emergency SIM card. This switching may take between 30 and 90 seconds. The cellular phone, which is registered with the network using the regular-use SIM card, unregisters from the cellular network, and subsequently reregisters using the emergency SIM card. This switching may cause precious time to be lost.

Delays in other situations can also occur, such as with operators of rental cars who need to insert their own SIM card in order to be identified by the network operator. Switching between a regular-use and an emergency use SIM card may be necessary when placing an emergency call from a mobile device contained in a rental car so that the network operator may identify the user according to the user's telephone number stored on the emergency SIM card. The network operator may also identify the user according to the cell phone serial number; however, network operators generally do not permit identification via serial number for security reasons.

SUMMARY

An emergency call system is provided that initiates an emergency call without substantial delay after being activated. When an emergency call is initiated, the emergency call system does not need to unregister from a previously established communication link, and subsequently establish a new communication link for transmitting an identification key for the emergency call. Instead, the emergency call system may instantaneously retrieve and transmits the identification key using the previously established communication link.

The emergency call system includes an emergency call device for initiating an emergency call over a communication network via a wireless communication link. The emergency call device generally includes a mobile communication device, a data module for storing information relating to regular use of the communication network (a "regular-use data module"), a data module for storing information relating to emergency use of the communication network (an "emergency data module"), a data retrieving module, and a transmitter. The information stored by the emergency data module also includes an identification key for identifying a user of the emergency call system. The regular-use data module and the emergency data module may be integrated or in communication with the mobile communication device, and may be in communication with the data retrieving module and the transmission module. The data retrieving module retrieves the identification key from the emergency data module upon activation of the emergency call system. The transmission module transmits the identification key to a recipient device within the communication network over a communication link established using information retrieved from the regular-use data module.

The emergency call device may be implemented in a vehicle. When implemented in a vehicle, a data retrieving module for the regular-use data module and/or the emergency data module may be in communication or integrated with a multimedia device within the vehicle, such as a radio receiver, an audio and video entertainment system, a navigation system, a function control system, and the like. Thus, the data retrieving module may not be co-located with the mobile communication device. Therefore, the emergency call device may include a local communication network for communicating the information retrieved by the data retrieving module to the mobile communication device.

The emergency call system further includes a method for initiating an emergency call from a mobile communication device over a communication network via a wireless communication link. The method includes establishing a communication link between the mobile communication device and the communication network using information retrieved from the regular-use data module. Upon activation of the emergency call system, for example upon operation of a button, an identification key is retrieved from the emergency data module and transmitted to a recipient device within the communication network over the communication link.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A system for initiating an emergency call from a mobile communication device is presented (an "emergency call system"). More specifically, the system allows the mobile communication device to retrieve and transmit an identification key from an emergency data module, such as an emergency subscriber identity module ("SIM") card, independently of a regular-use (non-emergency) data module. Thus, the need to unregister the mobile communication device, and reregister the mobile communication device with the emergency data module may be eliminated. Therefore, the system may not loose precious time initiating an emergency call.

Figure 1:
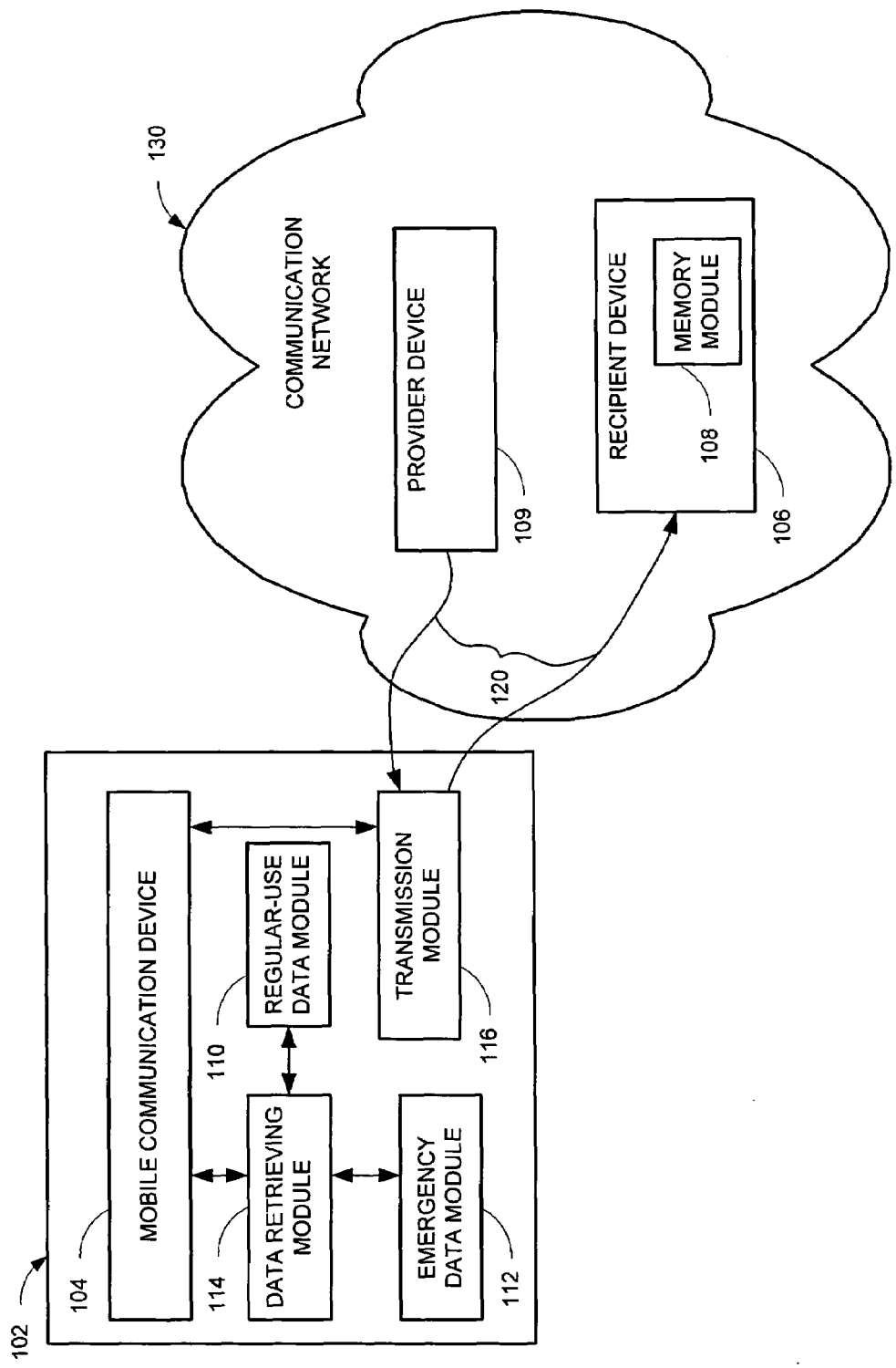
FIG. 1 is a block diagram of an emergency call device and a communication system.

An example of an emergency call device and a communication network is shown in FIG. 1. The communication network 130 may include a recipient device 106 or a network of recipient devices capable of receiving information from one or more mobile communication devices, a provider device 109 or a network of provider devices capable of transmitting information to one or more mobile communication devices. The communication network 130 may include networks, for example, cellular phone networks such as the Global System for Mobile Communication ("GSM"), the Universal Mobile Telecommunication System ("UMTS"), the Advanced Mobile Pone Service, ("AMPS"), and the like, and satellite communication networks and the like. The recipient device 106 allows unidirectional communication from a mobile communication device to the communication network 130. The recipient device 106 along with the provider device 109 allows bidirectional communication between a mobile communication device and the communication network 130. Alternately, the provider device 109 and the recipient device may be included in a single device.

The emergency call device 102 generally includes a mobile communication device 104, a data retrieving module 114, a regular-use data module 10 with the communication network 130, and an emergency data module 112 for storing information related to emergency calls. The regular-use data module 110 includes a data carrier for storing information relating to regular (non-emergency) use of the mobile communication device 104. The emergency call device 102 may further include a data retrieving module 114 for retrieving information from the emergency data module 112 and/or the regular-use data module 110.

The mobile communication device 104 may include a device that, while in motion, is capable of communicating with a stationary communication network, such as the communication network 130, and includes devices such as cellular phones, satellite communication devices, walkie-talkies, and the like. The mobile communication device 104 may communicate with the communication network in a unidirectional manner (from the communication device to the communications network) or in a bi-directional manner, using any type of electromagnetic communication. The mobile communication device 104 is further capable of using an established communication link 120 for initiating an emergency call. This communication link 120 may have been established for regular-use of the mobile communication device 114 using information retrieved from the regular-use data module 110 prior to the initiation of an emergency call. An emergency call initiated by the mobile communication device 114 may include information retrieved from the emergency data module 112, and is generally transmitted to the recipient device 106, which is within the communication network 130 via the transmission module 116. The transmission module 116 may alternatively be included as part of the mobile communication device 104.

The regular-use data module 110 may be in communication with the data retrieving module 114 or the mobile communication device 104. Alternatively, the regular-use data module may be integrated in the mobile communication device 104. Typically, the information stored in the regular-use data module 110 includes information identifying the user of the mobile communication device 104. The regular-use data module 110 may be removable so that two or more users can use and be identified by the mobile communication device 110 by inserting their respective personal data module. The regular-use data module 110 may include diskettes, memory cards, CD-ROMS, DVD-ROMs, chip cards, SIM cards, and the like.

The emergency data module 112 may be in communication with the data retrieving module 114 or the mobile communication device 104. Alternatively, the emergency data module 112 may be integrated in the mobile communication device 104. The information stored on the emergency data module 112 may include an identification key such as a numerical or alpha-numerical value. Alternatively, the emergency data module 112 may store an algorithm for calculating an identification key based on a check number transmitted by the provider device 109 in the communication network 130 to the mobile communication device 104 when the mobile communication device 104 is initiating an emergency call. The provider device 109 is provided with the same algorithm, and is therefore able to determine whether the identification key calculated and transmitted by the mobile communication device 104 is correct. This significantly improves the security of data transmission.

The information stored in the emergency data module 112 may be independent of the information stored in the regular-use data module 110. Therefore, it is possible to initiate an emergency call using information stored in the emergency data module 112 independently of the information stored on the regular-use data module 110. In other words, it is possible to initiate an emergency call independent of the present user of the mobile communication device 104. The emergency data module 112 may or may not be removable from the mobile communication device 104. The emergency data module 112 may include non-volatile memory such as, ROMs, Flash-ROMs, chip cards, and the like. If the mobile communication device 104 includes a cellular phone, the emergency data module 112 may include a SIM card.

The recipient device 106 may include a memory module 108 that stores one or more identification keys. When an emergency call is initiated, the data retrieving module 114 retrieves the identification key from the emergency data module 112 and the transmission module 116 transmits the identification key via an established link 120 to the recipient device 106. The recipient device 106 compares the received identification key with the identification keys stored in the memory module 108. If the received identification key corresponds to one of the identification keys stored in the memory module 108, the network operator may initiate standard measures for responding to an emergency.

Figure 2:
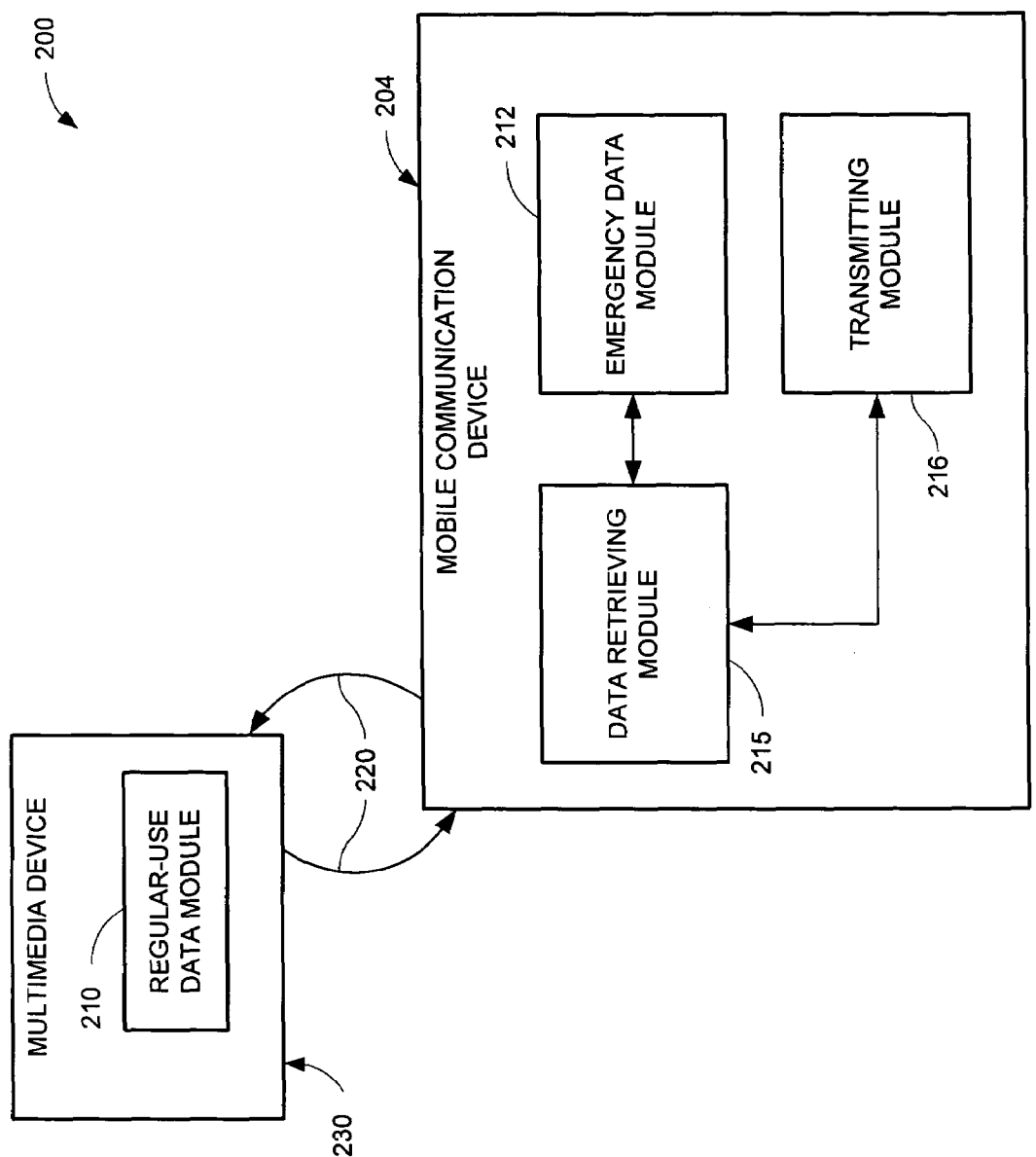
FIG. 2 is a block diagram of an emergency call device.

Another example of an emergency call device is shown in FIG. 2. Except as otherwise indicated, the components of the emergency call device 200 include the elements and features described in connection with the emergency call device of FIG. 1. The emergency call device of FIG. 2 may be useful when the emergency call device 200 is implemented in a situation, such as in a vehicle, where the data retrieving module for the regular-use data module and/or the emergency data module may or may not be co-located with the mobile communication device. The emergency call device 200 generally includes a multimedia device 230 and a mobile communication device 204. The multimedia device 230 may include, for example, a radio receiver, audio and video entertainment system, navigation system, function control system, head unit, and combinations of the foregoing. In addition, the multimedia device 230 may include and serve as a data retrieving module for the regular-use data module 210.

The mobile communication device 204 may be in communication with the multimedia device 230, or integrated with the multimedia device 230 (not shown). The mobile communication device 204 may include an emergency data module 212, a data retrieving module 215, and a transmission module 216.

The information retrieved from the regular-use data module 210 may be transmitted to the mobile communication device 204 using a local communication network 220. Suitable local communication networks 220 include electrical data networks, optical data networks, such as a media-oriented systems transport ("MOST") data bus, wireless networks, such as wide area networks ("WLAN"), Bluetooth, and the like. However, other optical and non-optical data buses may be used.

As an emergency call is being transmitted by the mobile communication device 204, additional information may also be transmitted. This additional information may be obtained from a user (for example, via a voice recording or data input), or from other devices in communication with the mobile communication device 204. For example, if the emergency data device 200 is implemented in a vehicle, and a position determination device, such as a global positioning satellite ("GPS") sensor, is in communication with the mobile communication device 204, the position of the vehicle may be transmitted as part of the emergency call. In another example in which the emergency data device 200 is implemented in a vehicle, information indicating the occurrence of an accident, such as information produced by airbag sensors when airbags are deployed, may be transmitted.

Figure 3:
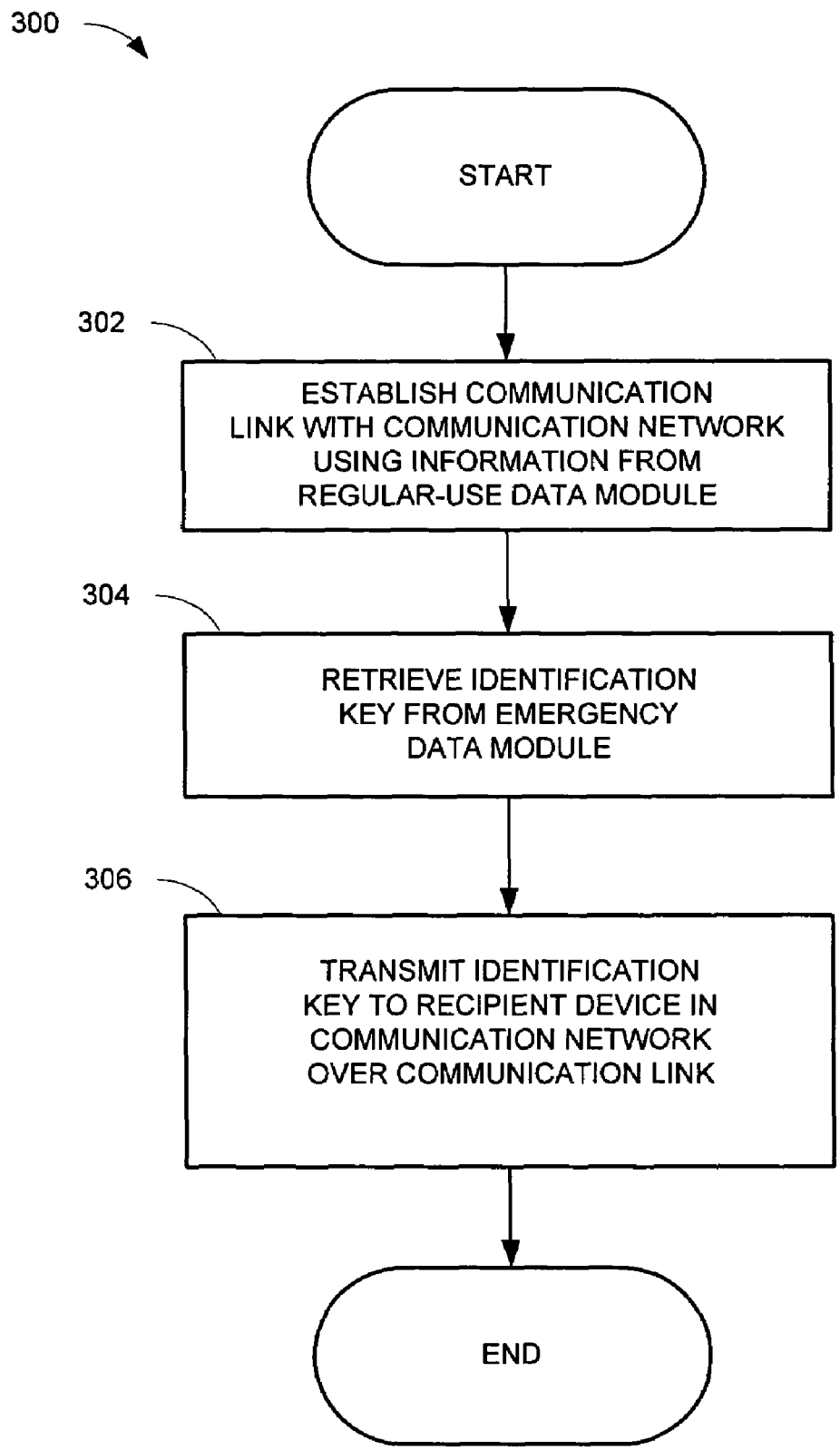
FIG. 3 is a flow chart of a method for initiating an emergency call from a mobile communication device.

The emergency call system may include a method for initiating an emergency call from a mobile communication device, such as the mobile communication device 103 shown in FIG. 1. Referring to FIG. 3, the method 300 generally includes establishing a communication link using information from a regular-use data module 302. The communication link is generally established when the mobile communication device is activated to place a non-emergency call. When an emergency occurs, an emergency call may be initiated by, for example, depressing a button located on the mobile communication device. Initiating the emergency call includes retrieving an identification key from an emergency data module 304, and transmitting the identification key to a recipient device within the communication network over the communication link 306.

The method 300 may subsequently include the recipient device verifying the identification key by determining whether the identification key corresponds to any identification keys stored in the memory module of the recipient device. If the identification key received by the recipient device corresponds to one of the identification keys stored in memory, the emergency call may be placed. In addition, in response to the emergency call, the network operator may then initiate standard measures for responding to an emergency. If the memory module of the recipient device contains additional information, the recipient device may further forward the emergency call to additional recipient devices, such as third parties that may provide emergency service, such as a car rental company owning the vehicle in which the emergency data device is installed. Further, the recipient device may retrieve additional information from the memory module, such as, specific information relating to the user, like specific health problems. Using this method, a valuable amount of time may be gained during an emergency by using the previously established communication link, and additional actions may be triggered by transmitting the identification key to the recipient device.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for initiating an emergency call over a communication link established for non-emergency calls between a mobile communication device and a communication network, comprising:

retrieving an identification key from an emergency data module;

transmitting the identification key over the communication link to a recipient device within the communication network; and initiating an emergency call if the identification key matches an authorized identification;

where retrieving and transmitting the identification key occurs without disconnecting the established communication link.

2. The method of claim 1, where the communication link is established using information stored in a data module.

3. The method of claim 2, where the identification key is unrelated to the information stored in the data module.

4. The method of claim 1, where the mobile communication device includes a cellular phone.

5. The method of claim 1, where the communication network includes a cellular phone network.

6. The method of claim 1, further comprising verifying whether the identification key received by the recipient device corresponds to one of a plurality of identification keys stored in a memory module accessible to the recipient device.

7. The method of claim 1, further comprising receiving a check number from a provider device within the communication network.

8. The method of claim 7, where retrieving the identification key includes determining the identification key based an algorithm retrieved from the emergency data module and the check number.

9. The method of claim 7, where the recipient device and the provider device are included in a single device.

10. A device for initiating an emergency call over a communication link established for non-emergency calls between the device and a communication network, comprising:

a mobile communication device configured to communicate with the communication network over a communication link;

a data module including information relating to non-emergency use of the communication network, and in communication with the mobile communication device;

an emergency data module including information relating to emergency use of the communication network, and in communication with the mobile communication device;

a transmission module in communication with the mobile communication device, and configured to transmit an identification key to the communication network over the communication link; and a recipient device configured to transmit an emergency call if the identification key matches an authorized identification key.

11. The device of claim 10, where the mobile communication device includes a cellular phone.

12. The device of claim 10, where the transmission module is included in the mobile communication device.

13. The device of claim 10, where the data module is included in the mobile communication device.

14. The device of claim 10, where the data module includes a subscriber identity module card.

15. The device of claim 10, where the data module is included in a multimedia device.

16. The device of claim 15, where the multimedia device includes a headunit configured for installation in a vehicle.

17. The device of claim 10, where the emergency data module is included in the mobile communication device.

18. The device of claim 10, where the emergency data module includes a subscriber identity module card.

19. The device of claim 10, where the information relating to the emergency use of the communication network includes an algorithm for calculating the identification key.

20. The device of claim 10, further comprising a network in communication with the data module and the emergency data module.

21. The device of claim 20, where the network includes an annular databus.

22. The device of claim 10, further comprising a data retrieving module in communication with the mobile communication device and the emergency data module, and configured to retrieve the identification key from the emergency data module.

23. The device of claim 22, where the data retrieving module is included in the mobile communication device.

24. A device for initiating an emergency call over a communication link established for non-emergency calls between the device and a communication network, comprising:

means for mobile communication configured to communicate with the communication network over the communication link;

a data storage means including information relating to non-emergency use of the communication network, and in communication with the means for mobile communication;

an emergency data storage means including an identification key, and in communication with the means for mobile communication;

a transmission means in communication with the means for mobile communication and configured to transmit the identification key to the communication network over the communication link;

means for a recipient device in the communication network to determine if the transmitted identification key corresponds to a stored identification key; and means for the recipient device to determine whether the emergency call should be placed.

* * * * *